(12) United States Patent
Woo

(10) Patent No.: US 11,398,759 B2
(45) Date of Patent: Jul. 26, 2022

(54) MOTOR

(71) Applicant: LG INNOTEK CO., LTD., Seoul (KR)

(72) Inventor: Shung Hun Woo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 215 days.

(21) Appl. No.: 16/632,644

(22) PCT Filed: Jul. 19, 2018

(86) PCT No.: PCT/KR2018/008142
§ 371 (c)(1),
(2) Date: Jan. 21, 2020

(87) PCT Pub. No.: WO2019/017699
PCT Pub. Date: Jan. 24, 2019

(65) Prior Publication Data
US 2020/0169138 A1 May 28, 2020

(30) Foreign Application Priority Data
Jul. 19, 2017 (KR) .......................... 10-2017-0091583

(51) Int. Cl.
*H02K 3/28* (2006.01)
*B62D 5/04* (2006.01)
(Continued)

(52) U.S. Cl.
CPC ............. *H02K 3/28* (2013.01); *B62D 5/0409* (2013.01); *H02K 1/14* (2013.01); *H02K 3/18* (2013.01); *H02K 3/345* (2013.01); *H02K 15/095* (2013.01)

(58) Field of Classification Search
CPC .......... H02K 3/18; H02K 3/28; H02K 15/095; H02K 3/47; H02K 3/24; H02K 3/32; H02K 3/34; H02K 15/045; H01F 41/065
See application file for complete search history.

(56) References Cited

U.S. PATENT DOCUMENTS 7,557,483 B2 * 7/2009 Yasuhara ................. H02K 3/28
310/184
9,154,010 B2 * 10/2015 Yokogawa ............. H02K 3/345
(Continued)

FOREIGN PATENT DOCUMENTS

CN 1767319 A 5/2006
JP 2005-110413 A 4/2005
(Continued)

OTHER PUBLICATIONS

Supplementary European Search Report dated Mar. 3, 2021 in European Application No. 18835309.8.
(Continued)

*Primary Examiner* — Quyen P Leung
*Assistant Examiner* — Leda T Pham
(74) *Attorney, Agent, or Firm* — Saliwanchik, Lloyd & Eisenschenk

(57) ABSTRACT

The present invention may provide a motor including a rotating shaft, a rotor coupled to the rotating shaft, and a stator disposed outside the rotor, wherein the stator includes a stator core having a plurality of teeth, and a coil wound around each tooth of the teeth, the coil is wound a plurality of turns around the tooth, and only the coil of $(a*n+1)^{th}$ turns among the plurality of turns forms a first layer closest to the tooth, wherein a is the number of total stacked layers of the coil, and n is zero or a positive integer.

8 Claims, 13 Drawing Sheets

(51) Int. Cl.
*H02K 1/14* (2006.01)
*H02K 3/18* (2006.01)
*H02K 3/34* (2006.01)
*H02K 15/095* (2006.01)

(56) References Cited

U.S. PATENT DOCUMENTS

| | | |
|---|---|---|
| 2005/0212644 A1 | 9/2005 | Yoshimori |
| 2012/0313477 A1 | 12/2012 | Haga et al. |
| 2014/0028143 A1 | 1/2014 | Ishigami et al. |
| 2014/0375161 A1* | 12/2014 | Haga .................. H02K 1/27 310/156.01 |
| 2018/0309338 A1* | 10/2018 | Uno .................... H02K 3/18 |

FOREIGN PATENT DOCUMENTS

| | | |
|---|---|---|
| JP | 2005-117751 A | 4/2005 |
| JP | 2006-333670 A | 12/2006 |
| JP | 2008-278628 A | 11/2008 |
| JP | 2010-220336 A | 9/2010 |
| JP | 2011-239535 A | 11/2011 |
| JP | 2011-239536 A | 11/2011 |
| JP | 5214646 B2 | 6/2013 |
| JP | 5619046 B2 | 11/2014 |
| KR | 10-2017-0055730 A | 5/2017 |
| KR | 10-2017-0071309 A | 6/2017 |

OTHER PUBLICATIONS

Office Action dated Apr. 28, 2021 in Chinese Application No. 201880048160.X.
International Search Report in International Aprlication No. PCT/KR2018/008142, filed Jul. 19, 2018.
Office Action dated Dec. 16, 2021 in Korean Application No. 10-2017-0091583.

* cited by examiner

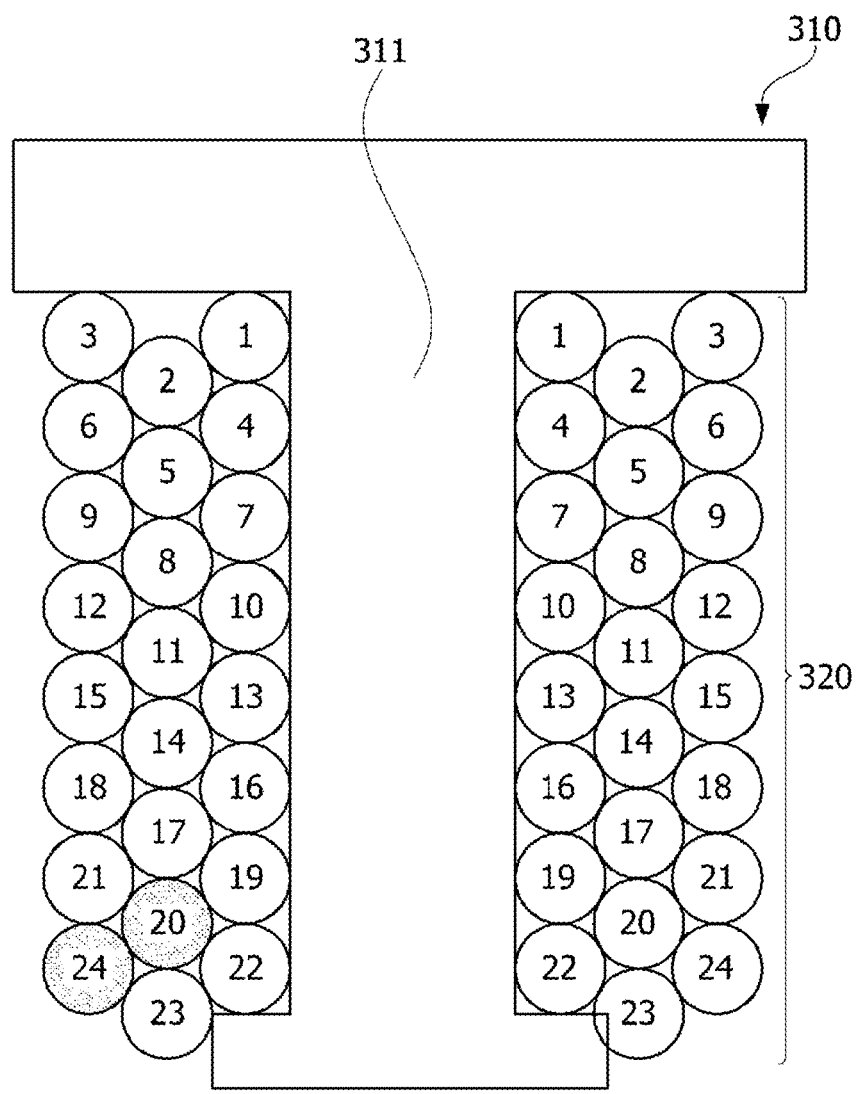

MOTOR

CROSS-REFERENCE TO RELATED APPLICATIONS

This application is the U.S. national stage application of International Patent Application No. PCT/KR2018/008142, filed Jul. 19, 2018, which claims the benefit under 35 U.S.C. § 119 of Korean Application No. 10-2017-0091583, filed Jul. 19, 2017, the disclosures of each of which are incorporated herein by reference in their entirety.

TECHNICAL FIELD

The present invention relates to a motor.

BACKGROUND ART

An electric power steering system (EPS) is a system which secures turning stability of a vehicle and rapid restoring force so that a driver can stably drive. The EPS drives a motor to control operation of a steering shaft of the vehicle through an electronic control unit (ECU) according to travel conditions detected by a vehicle speed sensor, a torque angle sensor, and the like.

The motor includes a stator and a rotor. The stator may include teeth forming a plurality of slots, and a coil is wound around each of the teeth. The coil is wound around the tooth to be stacked as a plurality of layers. In a case in which coils of the layers adjacent to each other are short-circuited, a closed circuit is generated so that a blocking torque is generated. The blocking torque hinders rotation of the motor so as to reduce performance of the motor. In this case, there is a problem in that, as a difference between turn numbers of the coils of the layers adjacent to each other increases, the blocking torque increases.

Technical Problem

The present invention is directed to providing a motor capable of reducing a blocking torque even using a parallel winding method.

Objectives that should be solved according to embodiments are not limited to the above described objectives, and other objectives which are not described above will be clearly understood by those skilled in the art from the following specification.

Technical Solution

One aspect of the present invention provides a motor including a rotating shaft, a rotor coupled to the rotating shaft, and a stator disposed outside the rotor, wherein the stator includes a stator core having a plurality of teeth and a coil wound around each tooth of the teeth, the coil is wound a plurality of turns around the tooth, and only the coil of $(a*n+1)^{th}$ turns among the plurality of turns forms a first layer closest to the tooth.

In this case, a is the number of total stacked layers of the coil, and n is zero or a positive integer.

The coil may be stacked as a plurality of layers on the tooth to and sequentially stacked from the first layer to an $a^{th}$ layer based on the first layer among the plurality of layers.

The coil of $(a*n+x)^{th}$ turns may be wound to be disposed as an x layer among the layers. In this case, a is the number of the total stacked layers of the coil, n is zero or a positive integer, and x is a positive integer less than or equal to a.

The stator may include an insulator disposed on the tooth, the insulator may include a body portion surrounding the tooth, the body portion may include a first side surface portion and a second side surface portion which are in contact with both side surfaces of the tooth, and a connecting portion which connects the first side surface portion and the second side surface portion, and the connecting portion may include winding guides protruding from a surface of the connecting portion.

The first side surface portion, the second side surface portion, and the connecting portion may include winding guide grooves concavely disposed in surfaces of the first side surface portion, the second side surface portion, and the connecting portion, and the plurality of winding guides may be disposed between the winding guide grooves disposed adjacent to each other.

The body portion may include an inner side guide and an outer side guide, and a height from the surface of the connecting portion to an upper end of the winding guide may be less than a height of the inner side guide from the surface of the connecting portion and a height of the outer side guide from the surface of the connecting portion.

A height of the coil guide may be less than $a*D$ and greater than $(a-1)*D$. In this case, a is the number of total stacked layers of the coil, and D is a diameter of a cross section of the coil.

A width of the winding guide may be less than a width of the connecting portion.

In a case in which a short circuit occurs in the coil of the layers adjacent to each other and a closed circuit is formed, the number of turns in the closed circuit is less than $a+1$.

Advantageous Effects

According to embodiments, an advantageous effect is provided in that a difference between turn numbers of coils of layers adjacent to each other is decreased to decrease a blocking torque even when a parallel winding method is used and a short circuit occurs.

DESCRIPTION OF DRAWINGS

FIG. 13 is a view illustrating a state of a coil that is short-circuited.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In descriptions of components of the present invention, terms such as "first," "second," "A," "B," "(a)," and "(b)" can be used.

The terms are only to distinguish one element from another element, and an essence, order, and the like of the element are not limited by the terms.

It should be understood that, when an element is referred to as being "connected or coupled" to another element, such a description may include both a case in which the element is directly connected or coupled to another element, and a case in which the element is connected or coupled to another element with still another element disposed therebetween.

In a case in which any one element is described as being formed or disposed "on or under" another element, such a description includes both cases in which the two elements are formed or disposed to be in direct contact with each other and one or more other elements are interposed between the two elements. In addition, when one element is described as being disposed "on or under" another element, such a description may include a case in which the one element is disposed at an upper side or a lower side with respect to another element.

Figure 1:
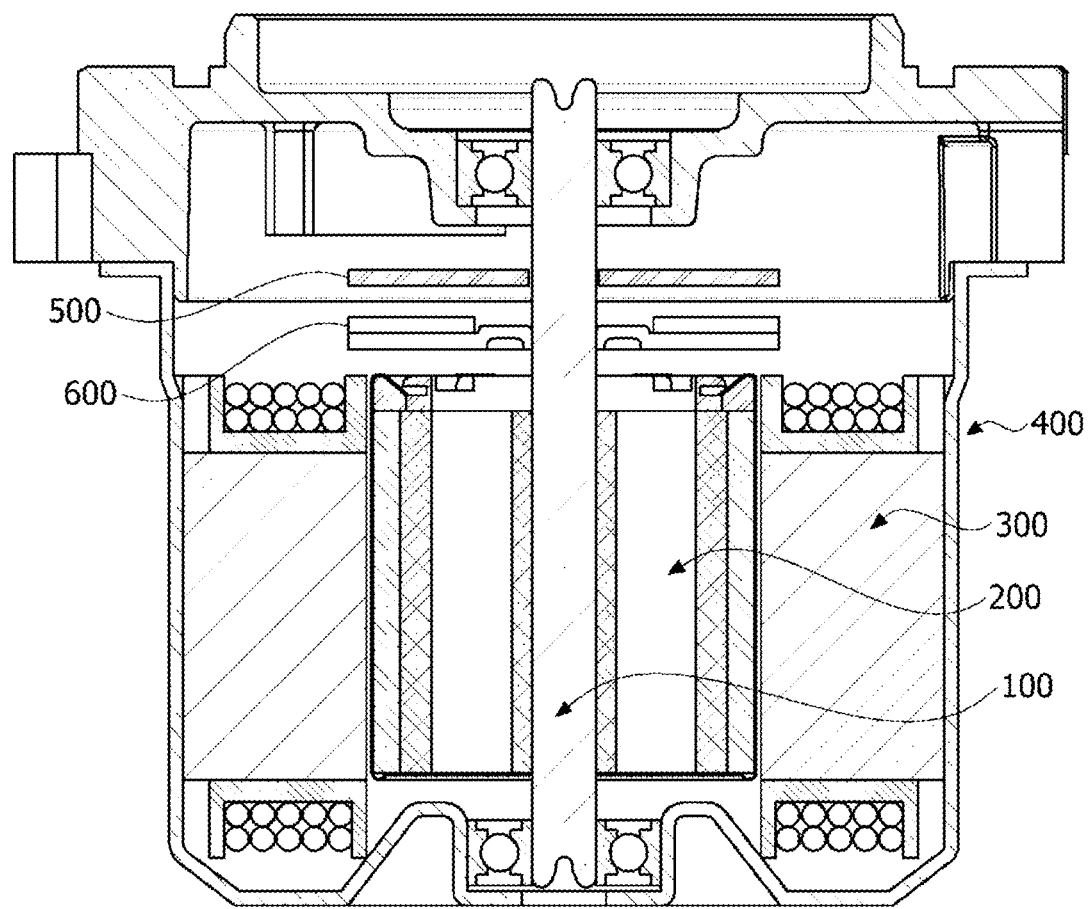
FIG. 1 is a view illustrating a motor according to an embodiment.

FIG. 1 is a view illustrating a motor according to an embodiment.

Referring to FIG. 1, the motor according to the embodiment may include a rotating shaft 100, a rotor 200, a stator 300, and a housing 400.

The rotating shaft 100 may be coupled to the rotor 200. When a current is supplied and an electromagnetic interaction occurs between the rotor 200 and the stator 300, the rotor 200 rotates and the rotating shaft 100 rotates in conjunction with the rotor 200. The rotating shaft 100 may be connected to a steering shaft of a vehicle to transmit power to the steering shaft.

The rotor 200 electrically interacts with the stator 300 and rotates.

The rotor 200 may include a rotor core and magnets. The rotor core may be formed of a plurality of plates, which each have a thin circular steel plate shape and are stacked, or may have a cylindrical shape. A hole coupled to the rotating shaft 100 may be formed at a center of the rotor core. A protrusion which guides the magnets may protrude from an outer circumferential surface of the rotor core. The magnets may be attached to the outer circumferential surface of the rotor core. The plurality of magnets may be disposed along a circumference of the rotor core at predetermined distances. The rotor 200 may include a can member which surrounds the magnets so that the magnets are fixed and not separated from the rotor core and are inhibited from being exposed.

A coil may be wound around the stator 300 to induce electrical interaction between the stator 300 and the rotor 200. A specific structure of the stator 300 around which the coil is wound will be described below. The stator 300 may include a stator core having a plurality of teeth. A ring-shaped yoke portion and the teeth around which the coil is wound from a yoke toward a center may be provided in the stator core. The teeth may be provided to be spaced a predetermined distance from each other along an outer circumferential surface of the yoke portion. Meanwhile, the stator core may be formed of a plurality of plates which each have a thin steel plate shape and are stacked on each other. In addition, a plurality of separate cores may be coupled or connected to each other to form the stator core.

The housing 400 may accommodate the rotor 200 and the stator 300 therein. The housing 400 has a cylindrical shape. In addition, an upper portion of the housing 400 is open. The open upper portion of the housing 400 is covered by a bracket. The stator 300 is positioned inside the housing 400, and the rotor 200 may be disposed inside the stator 300.

A sensor configured to detect a magnetic force of a sensing magnet 600 may be disposed on a printed circuit board 500. In this case, the sensor may be a Hall integrated circuit (IC). The sensor detects changes of an N-pole and a P-pole of the sensing magnet 600 to generate a sensing signal.

The sensing magnet 600 is coupled to the rotating shaft 100 to operate in conjunction with the rotor 200 so as to detect a position of the rotor 200.

Figure 2:
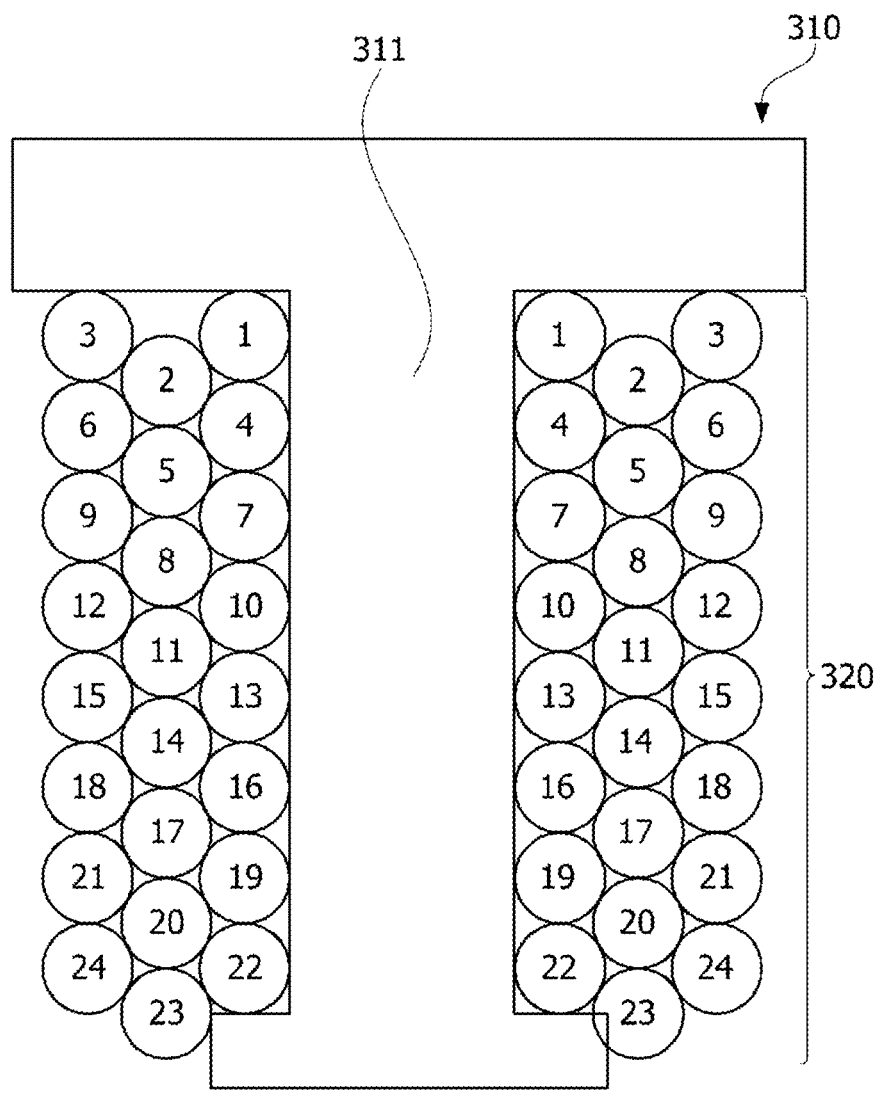
FIG. 2 is a cross-sectional view of a tooth of a stator which illustrates a state of a coil that is wound around the tooth.

FIG. 2 is a cross-sectional view of a tooth of a stator which illustrates a state of a coil that is wound around the tooth.

Referring to FIG. 2, a tooth 311 is disposed on the stator core 310. The coil 320 is wound a plurality of turns around the tooth 311. In FIG. 2, a number written in a circle which is a cross-section of the coil 320 refers to a turn number of the coil 320. The coil 320 is stacked on the tooth 311 to form a plurality of layers. For example, as illustrated in FIG. 2, the coil 320 may be wound twenty four turns around the tooth 311 to form three layers. Among the plurality of layers of the coil 320, the layer in contact with the tooth 311 is a first layer, the layer stacked on the first layer is a second layer, and the layer stacked on the second layer is a third layer.

In this case, the coil 320 may be wound around the tooth 311 such that the coil 320 of only $(a*n+1)^{th}$ turns among the plurality of turns forms the first layer closest to the tooth 311. In addition, the coil 320 of $(a*n+x)^{th}$ turns thereof may be wound around the tooth 311 to be disposed in an $x^{th}$ layer among the plurality of layers.

In this case, a is the number of total stacked layers of the coil 320 (for example, in the case of FIG. 2, a=3), n is zero or a positive integer, and x is a positive integer which is less than or equal to a.

For example, as illustrated in FIG. 2, the coil 320 of first, fourth, seventh, tenth, thirteenth, sixteenth, nineteenth, and twenty second turns of the coil 320 among the plurality of turns is wound to form the first layer in contact with the tooth 311. In addition, the coil 320 of second, fifth, eighth, eleventh, fourteenth, seventeenth, twentieth, and twenty third turns is wound to form the second layer stacked on the first layer. In addition, the coil 320 of third, sixth, ninth, twelfth, fifteenth, eighteenth, twenty first, and twenty fourth turns is wound to form the third layer stacked on the second layer.

FIGS. 3 to 6 are cross-sectional views of the tooth of the stator which illustrate a process in which the coil is wound around the tooth.

A winding process of the coil 320 will be specifically described below.

Figure 3:
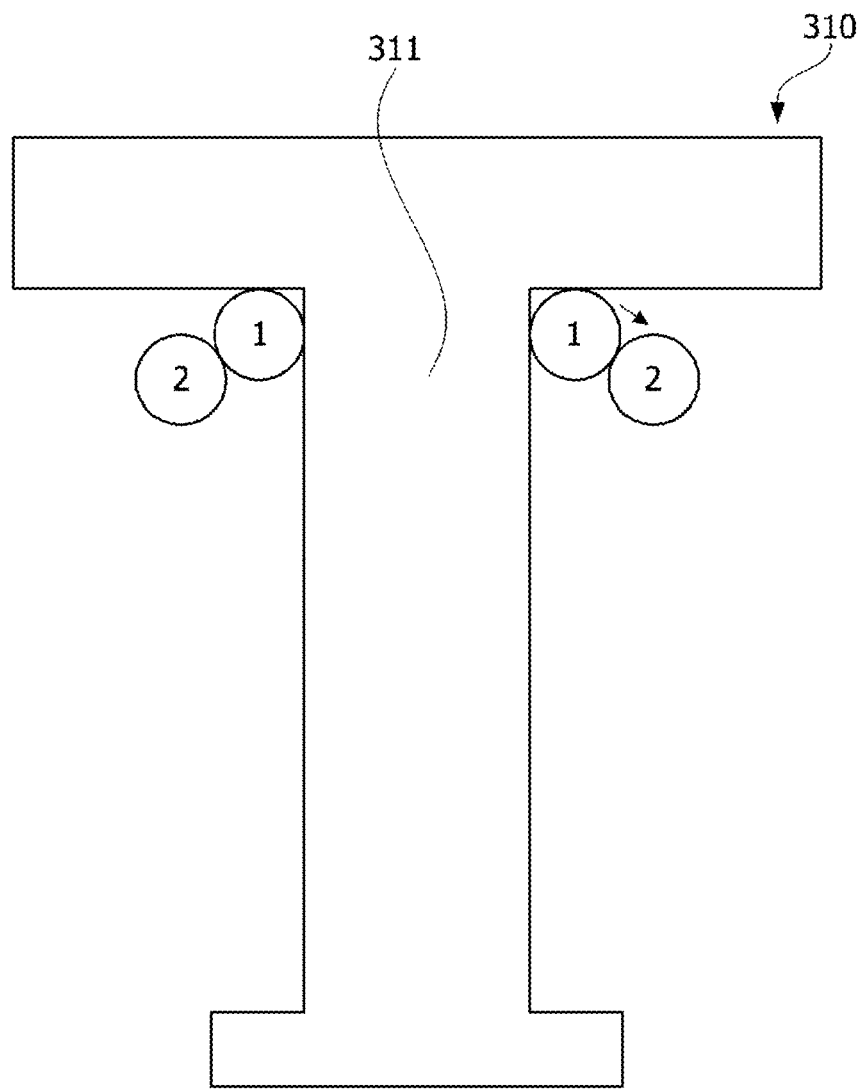
FIGS. 3 to 6 are cross-sectional views of the tooth of the stator which illustrate a process in which the coil is wound around the tooth.

Referring to FIG. 3, first, the coil 320 of the first turn is wound to be in contact with the tooth 311 so as to form the first layer. Next, the coil 320 of the second turn is wound to be stacked on the coil 320 of the first turn so as to form the second layer.

Figure 4:
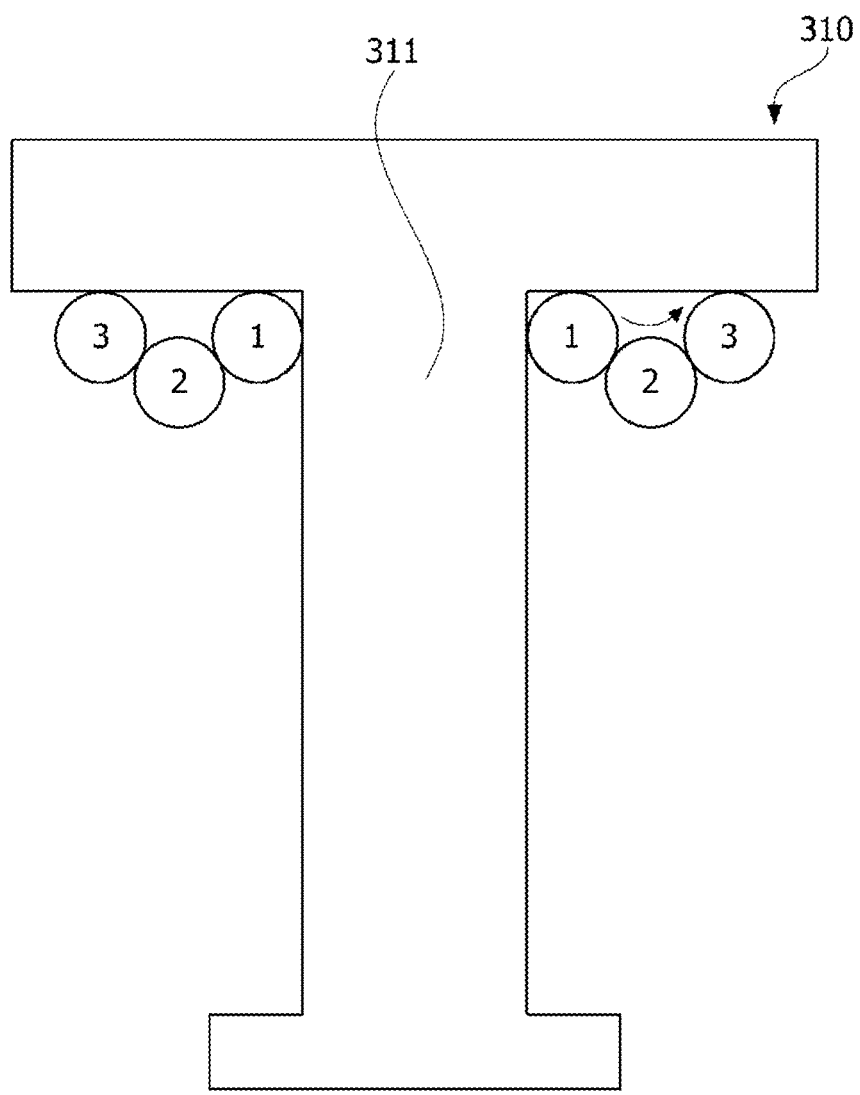

Referring to FIG. 4, next, the coil 320 of the third turn is wound to be stacked on the coil 320 of the second turn of the so as to form the third layer.

Figure 5:
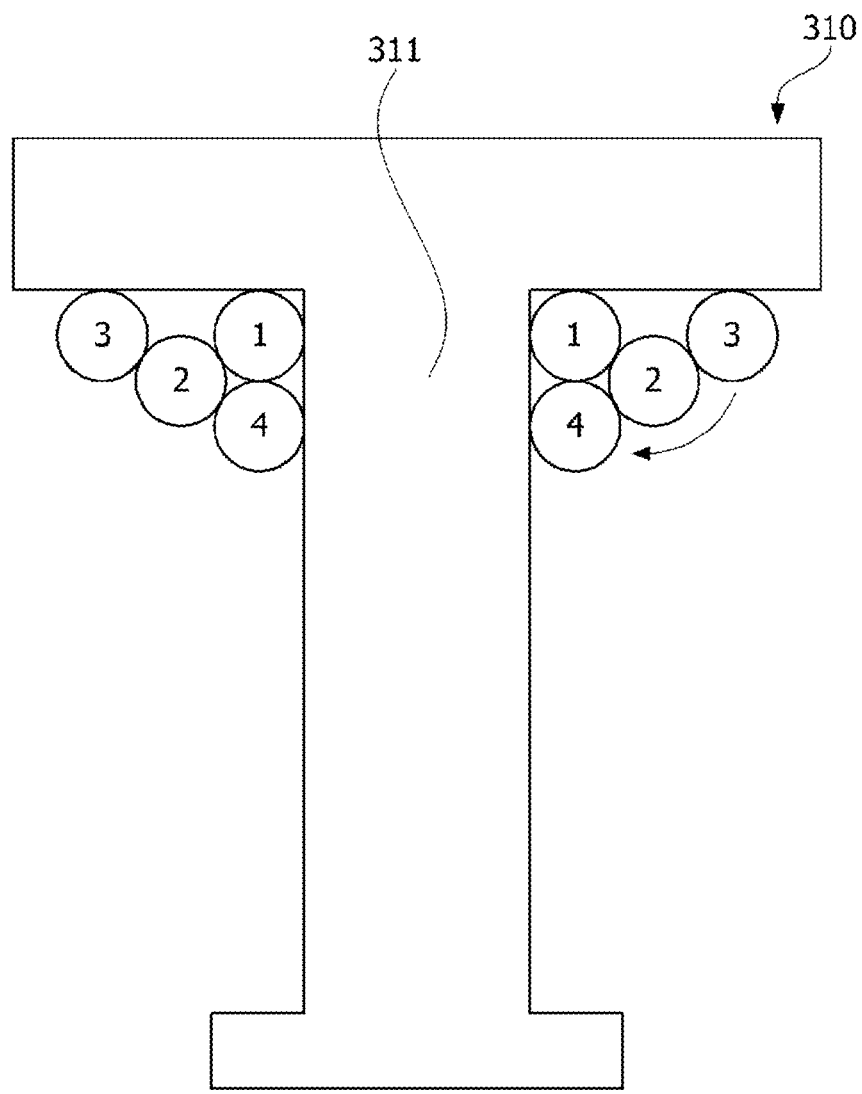

Referring to FIG. 5, the coil 320 of the fourth turn is wound to be in contact with the tooth 311 so as to form the first layer. The coil 320 of the fourth turn is disposed to be adjacent to the coil 320 of the first turn of in the same layer.

Figure 6:
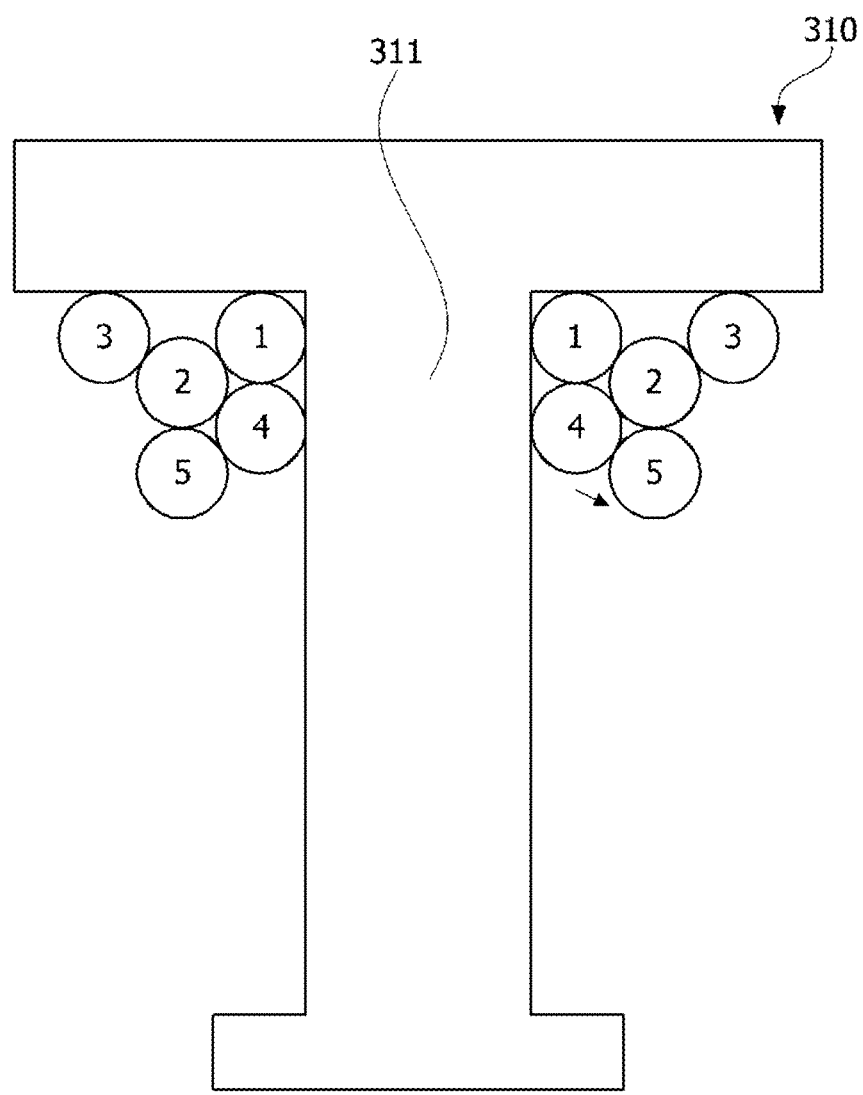

Referring to FIG. 6, next, the coil 320 of the fifth turn is wound to be stacked on the coil 320 of the fourth turn so as to form the second layer. The coil 320 of the fifth turn is disposed to be adjacent to the coil 320 of the second turn in the same layer.

When the winding process is performed as described above, as illustrated in FIG. 2, among the plurality of turns, the coil 320 of the first, fourth, seventh, tenth, thirteenth, sixteenth, nineteenth, and twenty second turns is wound to form the first layer in contact with the tooth 311. In addition, the coil 320 of the second, fifth, eighth, eleventh, fourteenth, seventeenth, twentieth, and twenty third turns is wound to form the second layer. In addition, the coil 320 of the third, sixth, ninth, twelfth, fifteenth, eighteenth, twenty first, and twenty fourth turns is wound to form the third layer.

The above described winding method of the coil 320 will be performed using an insulator which will be described below.

Figure 7:
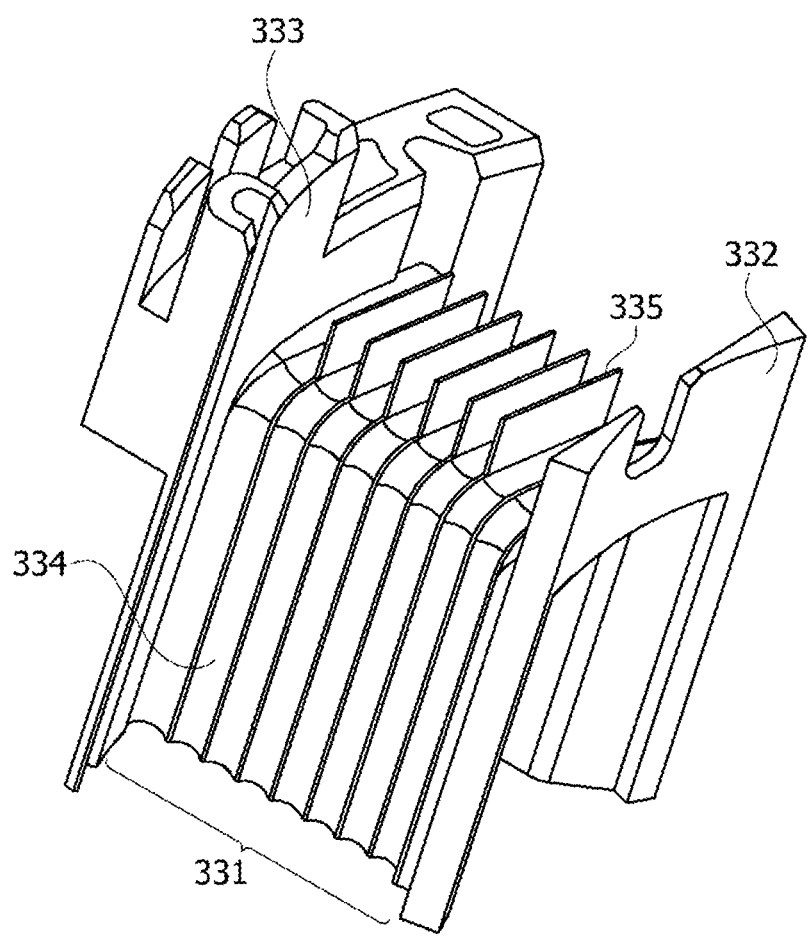
FIG. 7 is a view illustrating an insulator illustrated in FIG. 1.
Figure 8:
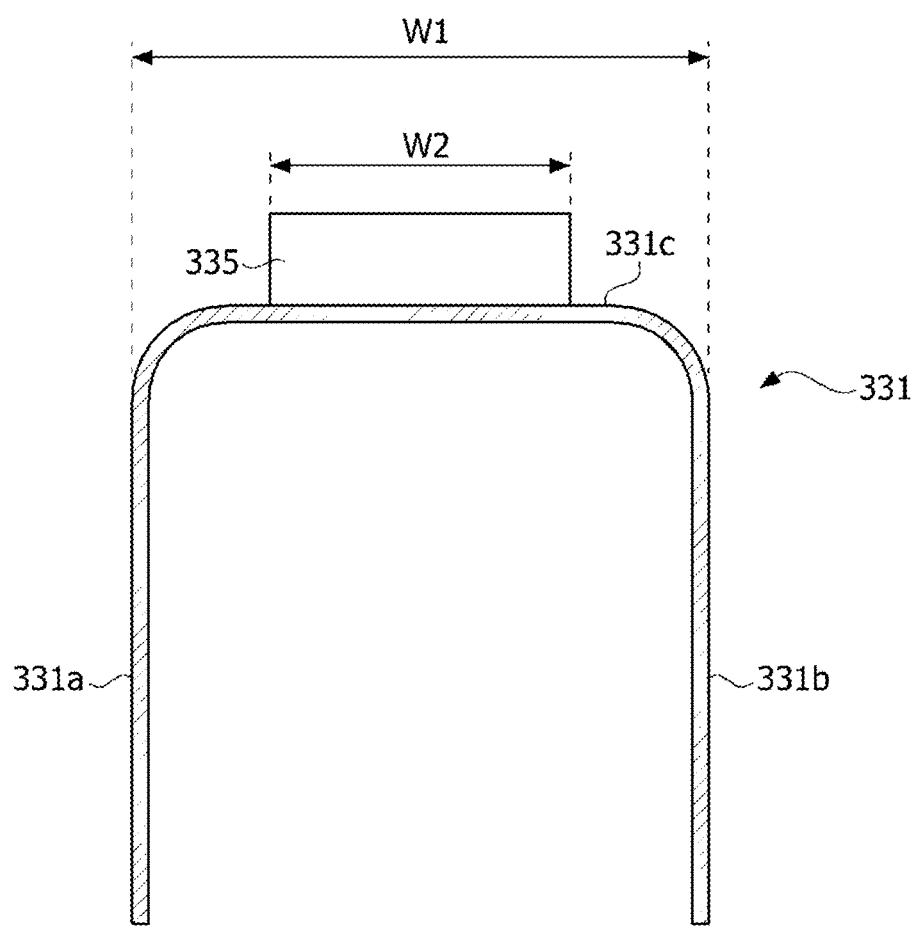
FIG. 8 is a partial cross-sectional side view illustrating the insulator illustrated in FIG. 7.
Figure 9:
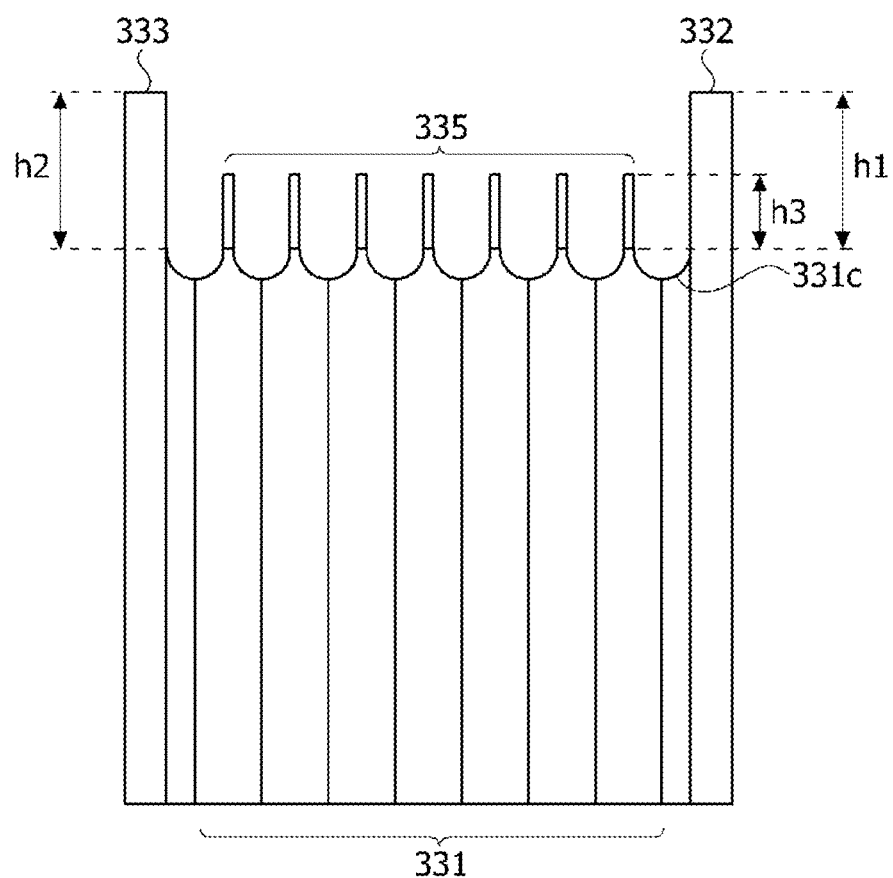
FIG. 9 is a front view illustrating the insulator illustrated in FIG. 7.

FIG. 7 is a view illustrating the insulator 330 illustrated in FIG. 1, FIG. 8 is a partial cross-sectional side view illustrating the insulator 330 illustrated in FIG. 7, and FIG. 9 is a front view illustrating the insulator illustrated in FIG. 7.

Referring to FIGS. 7 to 9, the insulator 330 may include a body portion 331, an inner guide 332, an outer guide 333, winding guide grooves 334, and winding guides 335. The body portion 331, the inner guide 332, the outer guides 333, and the winding guides 335 may only be separately described according to shapes and features thereof but are integrally formed to be connected to each other and form one single product.

The body portion 331 surrounds the tooth 311. The coil 320 is wound around the body portion 331.

The body portion 331 may include a first side surface portion 331a, a second side surface portion 331b, and a connecting portion 331c. An outer surface of the first side surface portion 331a and an outer surface of the second side surface portion 331b are regions around which the coil 320 is wound. In addition, an inner surface of the first side surface portion 331a and an inner surface of the second side surface portion 331b are regions in contact with the tooth 311. The connecting portion 331c connects an upper end portion of the first side surface portion 331a and an upper end portion of the second side surface portion 331b. A lower end portion of the first side surface portion 331a and a lower end portion of the second side surface portion 331b may be open. Two insulators 330 which are described above may be mounted on one tooth 311.

The inner guide 332 may be disposed to extend upward from an inner side end of the body portion 331.

The outer guide 333 may be disposed to extend upward from an outer side of the body portion 331.

The winding guides 335 are disposed to protrude from a surface of the connecting portion 331c. The winding guides 335 may be plate members. The winding guides 335 may be disposed along the winding guide grooves 334 disposed in the connecting portion 331c. In addition, the winding guides 335 may be disposed between the winding guide grooves 334 which are adjacent to each other. In addition, the plurality of winding guides 335 may be disposed.

Meanwhile, referring to FIG. 8, a width w2 of the winding guide 335 is less than a width w1 of the connecting portion 331c. In this case, the width w1 of the connecting portion 331c is a horizontal length of the connecting portion 331c, which is a distance between boundaries with the first side surface portion 331a and the second side surface portion 331b. In addition, referring to FIG. 9, a height h3 of the winding guide 335 is less than a height h1 of the inner guide 332 and a height h2 of the outer guide 333. In this case, the height h3 of the winding guide 335 is a vertical height from the surface of the connecting portion 331c to an upper end of the winding guide 335. In addition, the height h1 of the inner guide 332 is a vertical height from the surface of the connecting portion 331c to an upper end of the inner guide 332. In addition, the height h2 of the outer guide 333 is a vertical height from the surface of the connecting portion 331c to an upper end of the outer guide 333.

Figure 10:
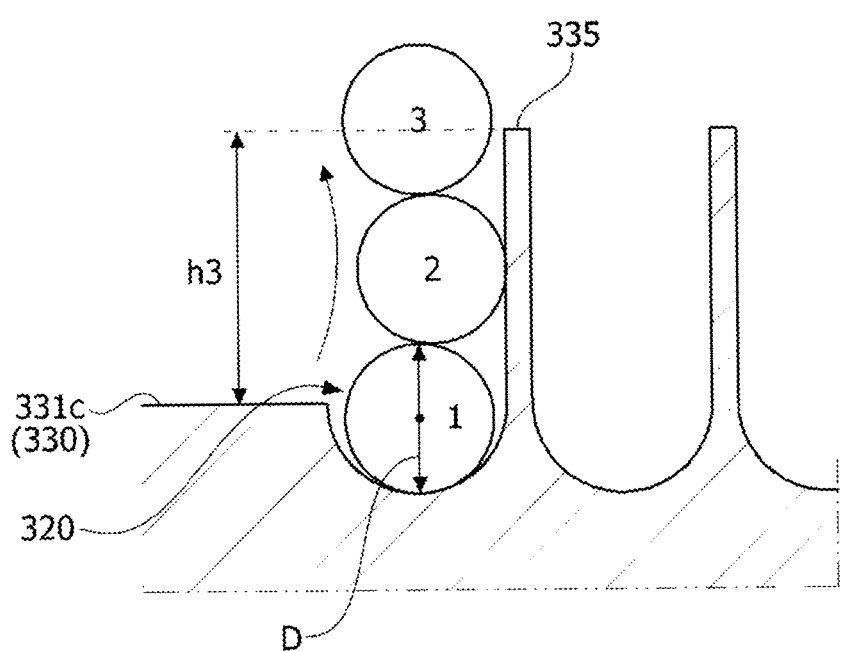
FIG. 10 is a view illustrating a winding guide which guides the coil during a winding process.

FIG. 10 is a view illustrating a winding guide which guides the coil during a winding process.

Referring to FIG. 10, the winding guides 335 guide the coil 320 to be stacked in the total layers. In the winding method for a motor according to the embodiment, after the coil 320 of the first turn is wound to be in contact with the tooth 311 to form the first layer, the coil 320 of the second turn is directly stacked on the coil 320 which disposed in the first layer. In this case, the winding guide 335 guides the coil 320 of the second turn of to be stably stacked on the coil 320 of the first turn.

Meanwhile, the height h3 of the winding guide 335 may be less than a*D and greater than (a−1)*D. In this case, a is the number of total stacked layers of the coil 320 (for example, a=3), and D is a diameter of a cross section of the coil 320. The height h3 of the winding guide 335 may not hinder a winding operation, and the coil 320 may be stably wound due to the height h3 of the winding guide 335.

Such a winding method of the coil 320 is for reducing a blocking torque. The blocking torque is a maximum torque generated when a closed circuit is formed in a case in which a short circuit occurs in the coil 320.

Figure 11:
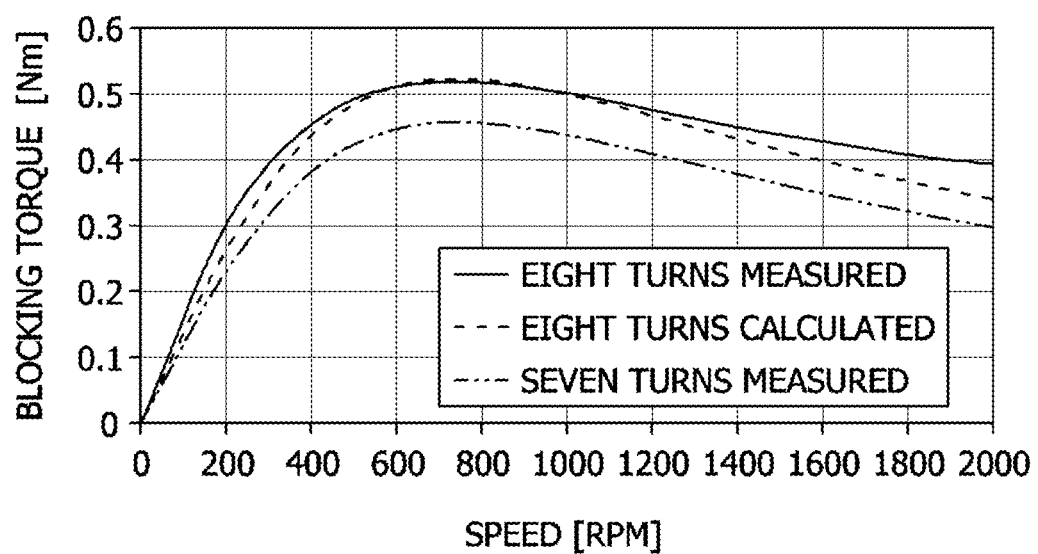
FIG. 11 is a graph showing blocking torque values according to the number of turns of a closed circuit.
Figure 12:
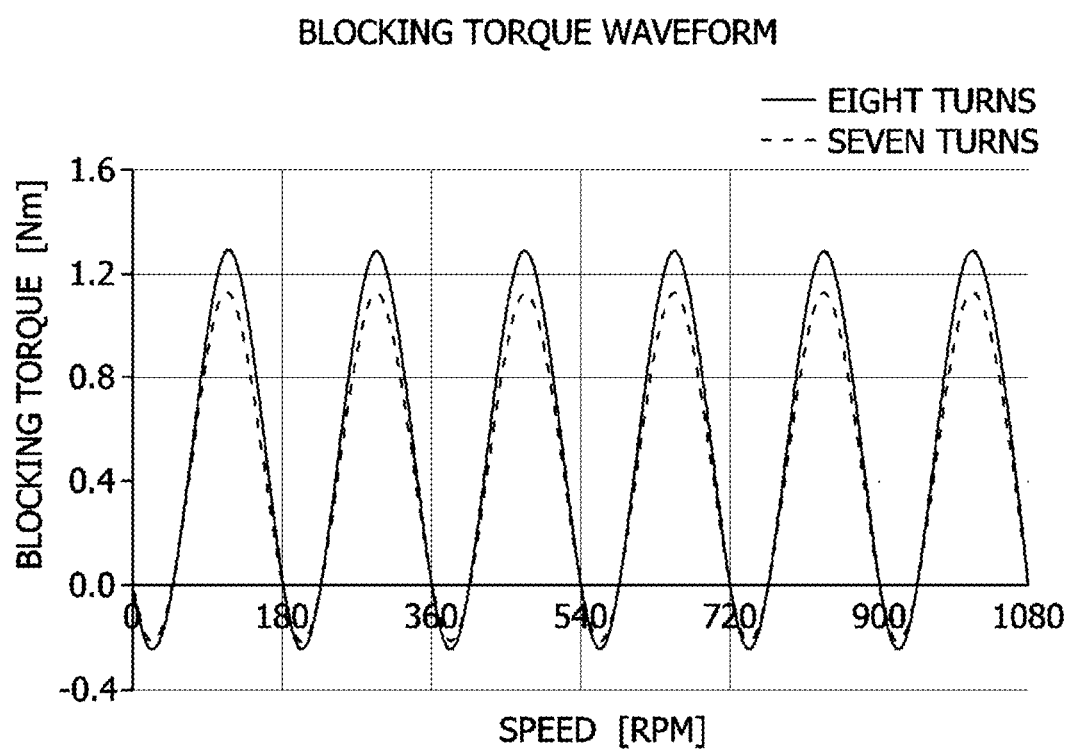
FIG. 12 is a graph showing waveforms of blocking torques according to the number of turns of the closed circuit.

FIG. 11 is a graph showing blocking torque values according to the number of turns of a closed circuit, and FIG. 12 is a graph showing waveforms of blocking torques according to the number of turns of the closed circuit.

Referring to FIGS. 11 and 12, it may be seen that, as the number of turns in a closed circuit increases, the blocking torque increases. For example, it may be seen that, in a case in which the number of turns in the closed circuit is seven, the blocking torque is 0.460 Nm at a speed of 800 rpm, but in a case in which the number of turns in the closed circuit is eight, the blocking torque increases to 0.517 Nm at a speed of 800 rpm. In this case, the number of turns in the closed circuit is a difference between turn numbers of coils of layers which are adjacent to each other and short-circuited. For example, in a case in which the coil of the first turn in the first layer is short-circuited with the coil of the eighth turn in the second layer in a state in which the first and second layers are adjacent to each other, the number of turns in the closed circuit turn is seven which is eight minus one.

Accordingly, as the number of turns in the closed circuit increases, the blocking torque increases to hinder rotation of the motor, and thus it is important to reduce the number of turns in the closed circuit.

FIG. 13 is a view illustrating a state of a coil that is short-circuited.

Referring to FIG. 13, in the motor according to the embodiment, in a case in which a short circuit occurs in the coil 320 of layers adjacent to each other, the number of turns in the closed circuit is less than that in a closed circuit in a case in which a short circuit occurs through a general parallel winding method. Specifically, in the motor according to the embodiment, in a case in which a short circuit occurs in the coil 320 of layers adjacent to each other and the closed circuit is formed, the number of turns in the closed circuit is less than or equal to a+1. In this case, a is the number of total stacked layers of the coil 320 (for example, a=3).

For example, in the case of the parallel winding method through which, after a coil is completely wound to form a first layer, a second layer is stacked on the first layer and a third layer is stacked on the second layer, a difference between turn numbers of coils of layers adjacent to each other is large. For example, in a case in which a coil of a first turn in the first layer is short-circuited with the coil of an eighth turn in the second layer, a difference between turn numbers of the coils of the different layers, that is, the number of turns in a closed circuit, corresponds to seven.

However, in the motor according to the embodiment, a difference between turn numbers of the coils of the layers adjacent to each other is relatively small. For example, when the coil of the twentieth turn in the second layer is short-circuited with the coil of the twenty fourth turn in the third layer, a difference between turn numbers of the coils of the layers, that is, the number of turns in a closed circuit is four, and is less than that in the closed circuit in the case of the general parallel winding method. In the case of FIG. 13, even when a short circuit occurs in the coil 32 of the layers, the number of turns in the closed circuit is not greater than four.

Accordingly, such a winding method has an advantage of significantly reducing the blocking torque even when the parallel winding method is used.

As described above, the motor according to one exemplary embodiment of the present invention has been specifically described with reference to the accompanying drawings.

Therefore, the above-described embodiments should be considered in a descriptive sense only and not for purposes of limitation, and the scope of the present invention is defined by the appended claims and encompasses all modifications or alterations derived from meanings and the scope of the appended claims, and equivalents thereof.

The invention claimed is:

1. A motor comprising:
a rotating shaft;
a rotor coupled to the rotating shaft; and
a stator disposed outside the rotor,
wherein the stator includes a stator core having a plurality of teeth and a coil wound around each tooth of the teeth,
wherein the coil is wound a plurality of turns around each tooth,
wherein only the coil of $(a*n+1)^{th}$ turns among the plurality of turns forms a first layer closest to the tooth,
wherein a is the number of total stacked layers of the coil on each tooth, and n is zero or a positive integer,
wherein each tooth is connected to an outer surface of the stator core,
wherein the coil is stacked as a plurality of layers on each tooth and sequentially stacked from a first layer to an $a^{th}$ layer, the first layer being closest to the tooth and the plurality of layers comprising at least the first layer, a second layer, and a third layer, and
wherein a turn of the first layer and a turn of the third layer are both in direct physical contact with the outer surface of the stator core.

2. The motor of claim 1, wherein the coil of $(a*n+x)^{th}$ turns is wound to be disposed as an x layer among the layers, wherein x is a positive integer less than or equal to a.

3. The motor of claim 1, wherein:
the stator includes an insulator disposed on each tooth;
the insulator includes a body portion surrounding each tooth;
the body portion includes a first side surface portion and a second side surface portion which are in contact with both side surfaces of each tooth, and a connecting portion that connects the first side surface portion and the second side surface portion; and
the connecting portion includes winding guides protruding from a surface of the connecting portion.

4. The motor of claim 3, wherein:
the first side surface portion, the second side surface portion, and the connecting portion include winding guide grooves concavely disposed in surfaces of the first side surface portion, the second side surface portion, and the connecting portion; and
the winding guides are disposed between the winding guide grooves disposed adjacent to each other.

5. The motor of claim 3, wherein:
the body portion includes an inner side guide and an outer side guide; and
a height from the surface of the connecting portion to an upper end of the winding guide is less than a height of the inner side guide from the surface of the connecting portion and a height of the outer side guide from the surface of the connecting portion.

6. The motor of claim 5, wherein a height from the surface of the connecting portion to the upper end of the winding guide is less than a*D and greater than (a−1)*D,
wherein D is a diameter of a cross section of the coil.

7. The motor of claim 3, wherein a width of the winding guide is less than a width of the connecting portion.

8. The motor of claim 1, wherein, in a case in which a short circuit occurs in the coil of the layers adjacent to each other and a closed circuit is formed, the number of turns in the closed circuit is less than the a+1.

* * * * *